United States Patent [19]

Hills

[11] Patent Number: 4,849,113

[45] Date of Patent: Jul. 18, 1989

[54] CONTINUOUS POLYMER FILTER

[76] Inventor: William H. Hills, 514 Hammock Rd., Melbourne Village, Fla. 32904

[21] Appl. No.: 197,281

[22] Filed: May 23, 1988

[51] Int. Cl.$^4$ .................. B01D 33/00; B01D 33/40; B01D 35/12; B01D 37/04

[52] U.S. Cl. .................. 210/741; 210/780; 210/790; 210/791; 210/106; 210/137; 210/138; 210/329; 210/340; 425/199

[58] Field of Search .............. 210/741, 780, 783, 790, 210/773.1, 791, 106, 107, 137, 138, 179, 329, 340, 341, 324, 387, 354; 425/199

[56] References Cited

U.S. PATENT DOCUMENTS

| | | | |
|---|---|---|---|
| 3,007,199 | 11/1961 | Curtis | 425/185 |
| 3,059,276 | 10/1962 | Yokana | 210/340 |
| 3,146,494 | 9/1964 | Sponaugle | 425/199 |
| 3,243,849 | 4/1966 | Joukaihen | 210/340 |
| 3,471,017 | 10/1969 | Kalman | 210/774 |
| 3,503,096 | 3/1970 | Marianelli | 210/341 |
| 3,645,399 | 2/1972 | Kalman | 210/184 |
| 3,669,166 | 6/1972 | Colin | 425/183 |
| 3,856,674 | 12/1974 | Kalman | 210/103 |
| 3,940,222 | 2/1976 | Zink | 210/341 |
| 3,940,335 | 2/1976 | Kalman | 210/179 |
| 4,167,384 | 9/1979 | Shirato et al. | 425/183 |
| 4,202,659 | 5/1980 | Kinoshita | 425/199 |
| 4,238,877 | 12/1980 | Rapp | 210/387 |
| 4,511,472 | 4/1985 | Trott | 210/340 |

Primary Examiner—W. Gary Jones
Assistant Examiner—Linda S. Evans
Attorney, Agent, or Firm—Epstein & Edell

[57] ABSTRACT

An improved continuous polymer filter of the screen belt type employs a valve arrangement to selectively apportion the extruder output flow through at least two filter paths. In the neutral valve position both filter paths receive polymer at equal flow rates creating a pressure across the screen belts that is too high to permit the screen belts to be advanced when a clogged belt section requires replacement with a clean section. To effect screen belt advancement, the valve is actuated to reduce the flow rate in the filter path requiring the replacement while increasing the flow rate to the same degree in the other filter path so that the net flow rate remains substantially constant. The screen belt receiving the reduced flow experiences a sufficiently reduced pressure drop thereacross to permit it to be advanced in a conventional manner, after which the valve is returned to its neutral state. The screen belts in both paths are advanced alternately while maintaining a constant net flow and assuring sufficient flow through the reduced flow path to avoid entry of air into the filter path. Valve actuation and screen belt advancement may be effected automatically and in synchronization in response to a pre-set timer, to detected pressure conditions in the flowing polymer, or other parameters.

19 Claims, 4 Drawing Sheets

U.S. Patent   Jul. 18, 1989   Sheet 1 of 4   4,849,113
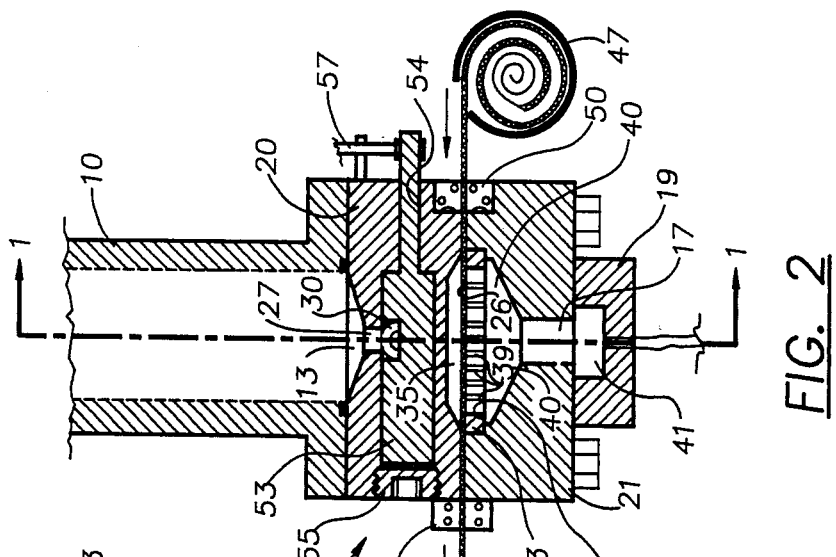
FIG. 2
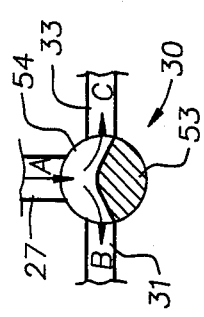
FIG. 4
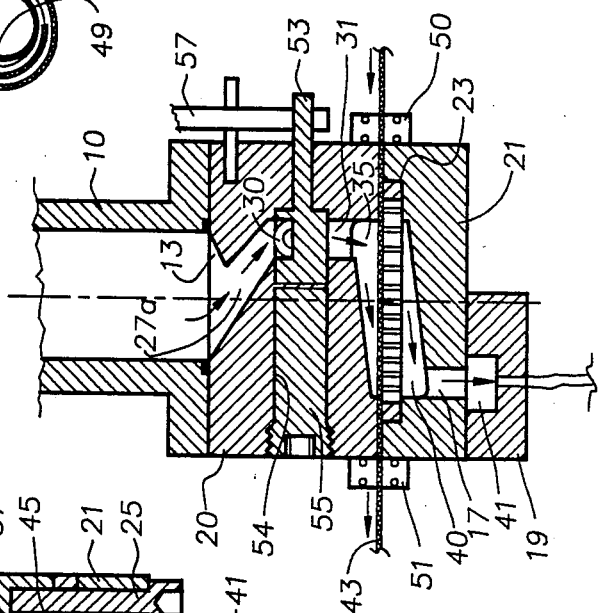
FIG. 5
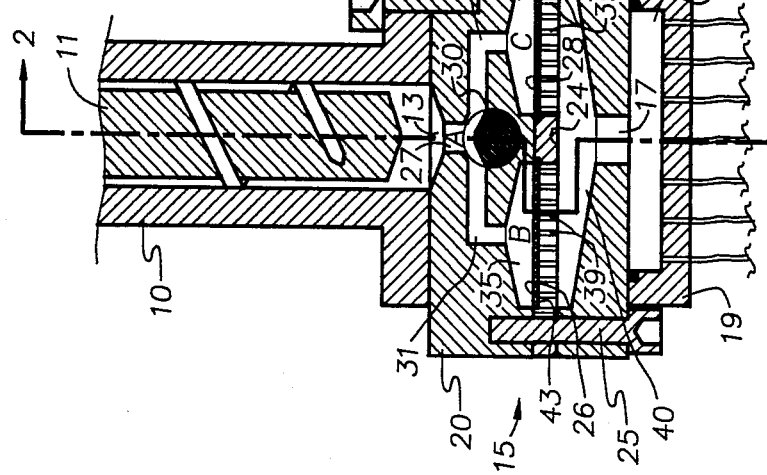
FIG. 3
FIG. 1

CONTINUOUS POLYMER FILTER

BACKGROUND OF THE INVENTION

1. The present invention relates to polymer filtration systems and, more particularly, to an improved method and apparatus for replacing clogged filter sections.

2. Discussion of the Prior Art

In extruding articles of small cross-section from thermoplastic polymers such as polyethylene, Nylon, polyester, polystyrene, etc., it is necessary to filter foreign material from the molten polymer. Two common examples of such articles are synthetic textile fibers and thin plastic films of the type used in packaging or for tapes (e.g., computer tape, sound recording tape, etc.) In the production of synthetic textile fibers, which may have a final diameter of as little as ten microns, a particle of foreign matter of five or more microns diameter is quite likely to cause breakage of the fiber during manufacturing. It is desirable, therefore, to filter out any foreign material above a certain size.

In the extrusion of pigmented fibers, the pigment particles may agglomerate to a sufficient size to cause fiber breakage. It is also desirable to filter out these excessively large particles, even though they are deliberately added to the polymer and are not, therefore, truly foreign material.

"Screen Changers" having a reciprocating plate or ram with two flat screen filter elements are well known in the prior art. An example of such a device may be found in U.S. Pat. No. 3,007,199 (Curtis). This type of filter is not suitable for fiber or thin film production because air is introduced into the molten polymer stream when a clean screen is shitted into place. The introduced air tends to cause holes in the extruded film, or breaks in extruded fibers, thereby interrupting smooth operation of the manufacturing process. In order to avoid this problem it is necessary to use a so-called "continuous" polymer filter wherein the polymer stream is not interrupted and no air can be introduced when clean filter media are brought into the polymer stream.

There are four general types of prior art continuous polymer filters that have achieved some commercial success, although each type has certain inherent problems and disadvantages. These four types of filters are: (a) the dual cartridge filter; (b) the dual ram filter; (c) the screen belt filter, sometimes called Kalman filter; and (d) the moving breaker plate filter. Each of these filters, as well as their advantages and disadvantages, is described in the following paragraphs.

Dual cartridge filters are disclosed in U.S. Pat. Nos. 3,940,222 (Zink); 3,503,096 (Marianelli); 4,202,659 (Kinoshita); 4,511,472 (Trott); and 3,669,166 (Colin). In addition, a dual cartridge filter is manufactured and sold by the Fluid Dynamics Company of Cedar Knolls, N.J. as the CPF System. Filters of this type generally include two small pressure vessels operating at working pressures of at least 3,000 psig. Each vessel contains one or more re-usable filter elements and some valve mechanism (generally two plug valves) in order to permit diversion of polymer flow from one vessel to the other. A vent, or the like, is provided at the high point of each vessel to bleed out all air when polymer is re-introduced into a vessel after its associated filter element has been cleaned. Dual cartridge filters normally require several minutes to remove a dirty element from the vessel from which polymer flow has been diverted, necessitating that all polymer be directed through the other element while the dirty element is being cleaned. The main advantage of dual cartridge filters resides in the fact that they permit each filter element to incorporate a very large area, thereby permitting very fine filter media to be employed (i.e., five or ten micron screen) without excessive pressure differential being developed across the filter. On the other hand, this type of filter has three main disadvantages, namely: (1) it is expensive to manufacture; (2) the filter elements are too costly to be disposable and therefore must be cleaned at considerable expense; and (3) the pressure differential across the filter rises markedly as one set of filter elements gets dirty, and then drops dramatically as clean elements are brought on stream. The change in pressure differential normally causes the extruder exit pressure to rise and fall, thereby varying the degree of polymer shearing and causing variations in the final product being extruded.

A dual ram filter is disclosed in U.S. Pat. No. 4,167,384 (Shirato et al). In addition, a dual ram filter is manufactured and sold by Maschinenfabrik Joachim Kreyenborg and Co. of West Germany as the K-SWE model continuous operating screen changer. These filters use simple flat pieces of woven screen wire as the filter medium and have two reciprocating rams that are similar to the single ram disclosed in the aforementioned Curtis patent. Each ram has its own screen and breaker plate, and both screens are in flow communication with both the extruder and the filter exit port. In order to change a dirty screen for a clean one, one of the rams is moved so as to bring the breaker plate region of the ram outside the filter body, permitting the machine operator to manually remove the screen, insert a new piece of screen, and then retract the ram into the body. The system includes means for filling the cavity on the upstream side of the screen with polymer, and means for bleeding out all of the air before the ram is moved to the full inward running position. Both rams are positioned within the body except for the short time interval required to change a screen. In this way no polymer solidifies on the breaker plate and it is not necessary to clean (i.e., "burn out") a breaker plate as required with the moving breaker plate type filter described below. The so-called "Kreyenborg ram" is provided with a very close fit within the body, thereby eliminating the need for seals utilized in the system disclosed in the aforementioned Curtis patent. The main advantage of the dual ram filter is its use of inexpensive flat woven screen and the absence of plates to be burned out. Disadvantages include: limited screen area; the likelihood of a ram getting stuck in the body and not moving freely; difficulty in sizing the bleed ports if different polymers of widely different viscosity are to be processed; large variations in pressure differential across the filter as a ram is shifted to change a screen; and high labor cost resulting from the need for an operator to be employed to change the screens which must be changed relatively frequently because of the requirement for a small screen area (relative to the dual cartridge filter).

Screen belt filters, sometimes referred to as "Kalman filters", are disclosed in U.S. Pat. Nos. 3,471,017 (Kalman); 3,645,399 (Kalman); 3,856,674 (Kalman); 3,940,335 (Kalman); and 4,238,877 (Rapp). A woven screen wire belt, one hundred feet or more in length, passes through a steel block normally bolted to the end of an extruder. The belt travels at right angles to the direction of polymer flow and is supported by a stationary breaker plate. Sealing devices surround the belt at the locations where the belt enters and leaves the block. Cooling of the sealing devices may be selectively effected via water or other liquid passing through flow paths defined in each sealing device. Electric heaters are provided to momentarily heat the sealing devices and thereby permit advancement of the belt in the manner described in the Kalman patents. Briefly, the belt exit slot is considerably thicker than the inlet passage, causing the polymer to leak at a more rapid rate from the exit passage when the sealing blocks are heated and thereby causing the screen to move along with the leaking softened polymer. The Kalman patents also disclose mechanical pulling arrangements for moving the screen, instead of relying solely on polymer leakage. It is also suggested in the Kalman patents that movement of the screen obliquely, relative to the polymer flow, can assist in screen movement while increasing the area of screen available for filtration. In operation, the inlet and exit seals are alternately heated and cooled to cause intermittent screen movement. While the Kalman patents indicate that it is possible to control the inlet and outlet seal temperatures to achieve steady, continuous movement of the screen, in practice it is quite difficult to accomplish this at the very slow rates required. Typically, these screen belt filters utilize a timer to turn the heat and cooling water on and off, resulting in small (e.g., perhaps one-tenth of the belt width) intermittent movements. The screen belt filter has many advantages: it is simple and inexpensive to manufacture; it functions totally automatically, requiring very little attention by the machine operator; movement of the screen in small increments results in only minor changes in the pressure differential across the filter; the screen is not too expensive and can be discarded; no "burn out" of breaker plates is required; and it has no moving parts except for the screen belt itself. The main disadvantage of the belt screen filter is its lack of suitability for filtering fine particles; therefore, these filters are generally used with screens having a filter rating of sixty to one hundred fifty microns. If a finer screen is employed, the pressure drop across the screen is so great that friction between the screen and the stationary breaker plate makes it impossible to advance the screen without causing screen failure due to excessive tension. A filter can be made for a screen of any width, but the breaker plate usually cannot be more than approximately 3.0 inches in the direction of screen movement, regardless of the width of the plate. This means that the breaker plate area increases only as the first power of the belt width, whereas the output flow from an extruder varies roughly according to the square of the screw diameter. This fact has limited the success of screen belt filters to smaller extruders, or to coarse filtration on a larger extruder (e.g., in excess of 4.5 inch screw diameter).

It must be stressed that, in spite of the popularity of the Kalman-type filter, there has been no solution in the prior art to the problem concerning the unsuitability of the filter with fine screen material for filtering fine particles. In fact, subsequent to obtaining his basic U.S. Pat. No. 3,471,017, Kalman obtained three additional U.S. Pat. Nos. 3,645,399; 3,856,674; and 3,940,335, all directed toward solving the same problem using the basic filter disclosed in U.S. Pat. No. 3,471,017. Kalman admits in U.S. Pat. No. 3,856,674 that, as the filter becomes progressively clogged with impurities, the force exerted upon the active part of the filter, resulting from the hydrostatic pressure on the substance being filtered, can rise to such an extent that, in cases of heavy contamination, it is extremely difficult to move the filter screen. Actually, the problem is not limited to heavy contamination. If a fine screen (e.g., ten to thirty microns) filter is employed for a high flow rate viscous polymer (e.g., five thousand pounds per hour of polymer at four thousand poise), an enormous Kalman filter assembly would be required, even if the polymer contains a very low level of contamination, because the pressure drop through a perfectly clean screen would be extremely high. This is a direct result of the requirement that the breaker plate area must be narrow in the belt movement direction; if it is not, the differential pressure renders belt movement virtually impossible.

None of the filters disclosed in the three aforementioned improvement patents of Kalman has achieved any commercial success, although the original Kalman filter continues to have wide acceptance on small extruders using screens no finer than sixty microns. It is believed that the absence of commercial success for the improvements results from the fact that all of the improvement devices disclosed by Kalman require complicated mechanical devices.

The other major type of continuous filter is manufactured by the Berlyn Corporation of Worcester, Mass. and sold under the model name Berlyn Continuous Filter Model CF3539. The so-called Berlyn filter functions in a manner somewhat similar to the Kalman screen belt filter in that seals at the inlet and outlet of the filter are kept cool by water, preventing polymer leakage by freezing any polymer tending to escape. With the Berlyn filter, a flat woven filter screen is supported by a heavy breaker plate pushed intermittently through the filter body by a large hydraulic cylinder. The seals are maintained at a steady temperature, and plate movement is in very small (e.g., 0.010 inch) and frequent steps (e.g., on the order of one per minute). Relative to the Kalman filter, the Berlyn filter offers two major advantages. Since the screen and breaker plate move together, there is no tensile force applied to the screen to initiate movement. This permits much finer screens to be employed. Also, there is no restriction against the polymer flow region of the screen having an approximately square configuration, or even a configuration which has a greater dimension in the direction of plate movement than the belt width dimension. Therefore, a moving breaker plate filter having, for example, a screen eight inches wide, is capable of having an opening of eight inches by ten inches or eighty square inches of area. A Kalman-type filter, on the other hand, would be limited to an opening of eight inches by three inches, for a total area of twenty-four square inches. The Berlyn filter is, therefore, more suitable for use on a large extruder or in applications requiring fine filtration. The main disadvantages of the Berlyn-type moving breaker plate filter relative to the Kalman-type filter are much higher manufacturing costs and the requirement to "burn out" and clean a breaker plate that emerges from the exit side of the filter assembly before that breaker plate can be fitted with clean screen material and re-inserted at the inlet end of the assembly.

In addition to the four types of filters described above, there are some backflush-type polymer filters in commercial use. These filters generally utilize a flat woven screen which is not changed but is backflushed periodically with polymer. Backflush filters are not too popular because they waste polymer in flushing, and because the flushing action is not altogether successful in removing very fine particles from very fine screen.

OBJECTS AND SUMMARY OF THE INVENTION

It is therefore an object of the present invention to provide an improved method and apparatus for performing continuous polymer filtration and, in particular, to provide improvements relating to the replacement of clogged filter sections.

It is another object of the present invention to provide a method and apparatus for performing continuous filtration of flowing polymer while clogged filter sections are being changed, wherein the pressure differentials across the filters due to clogging are minimized, filters are sufficiently inexpensive to be disposable, the limitations in screen area inherent in Kalman filters are avoided, the apparatus requires minimal operator attention, breaker plate "burn out" is eliminated and very fine screen material can be employed.

Accordingly, the present invention may be viewed as an improvement of the original Kalman screen belt continuous filtering apparatus and process as disclosed in U.S. Pat. No. 3,471,017. In the present invention, polymer egressing from an extruder (or from a continuous polymerizer) is directed to a three-way valve, such as a plug valve. From the two valve exit ports, the polymer is directed to two moving screens of the same general type used in the Kalman process. The belts are supported by breaker plates having a greater dimension of perforated area in the belt movement direction (i.e., longitudinally) than is provided in the Kalman process. This feature provides each screen belt with a substantially greater active filtering area. The filtered polymer discharge from each of the two screens is combined into one stream and directed to the extrusion die, or to a group of metering pumps (for fiber extrusion), or wherever the polymer is needed. As part of the process of the present invention, whenever one of the screen belts is to be moved polymer flow to that screen belt is partially restricted (e.g., to ten percent from fifty percent of total flow) by means of the three-way valve. To effect movement of the screen belt, the seals on the screen may be heated in synchronization with reduced polymer flow (i.e., in synchronization with valve operation), thereby causing the screen to move by differential pressure across the sealing plugs in the manner disclosed by Kalman. Alternatively, movement may be effected by applying a mechanical pull on the belt. Since polymer flow is reduced to the screen belt being moved, the pressure drop across the belt is also reduced, thereby facilitating movement of the belt in spite of the fact that the breaker plate area on the downstream side of the belt is greater than would normally be permissible with a single Kalman-type filter.

Actuation of the three-way valve increases the flow through the screen belt that is not being moved to the same degree that flow is reduced through the screen belt that is being moved. As a result, the net flow through the two filters remain substantially the same.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings wherein like reference numerals in the various figures are utilized to designate like components, and wherein:

FIG. 1 is a view in vertical section, taken along lines 1—1 of FIG. 2, of a filter assembly constructed in accordance with the present invention and operating in conjunction with a polymer extruder and pellet die assembly;

FIG. 2 is a view in vertical section taken along lines 2—2 of FIG. 1;

FIG. 3 is a schematic illustration of a three-way valve employed in the apparatus of FIG. 1 and shown in its balanced flow position;

FIG. 4 is a schematic illustration of the valve of FIG. 3 shown in an unbalanced flow position;

FIG. 5 is an alternative embodiment of the apparatus of FIG. 1 shown in vertical section taken along lines 2—2 of FIG. 1;

DESCRIPTION OF THE PREFERRED EMBODIMENTS

Figure 7:
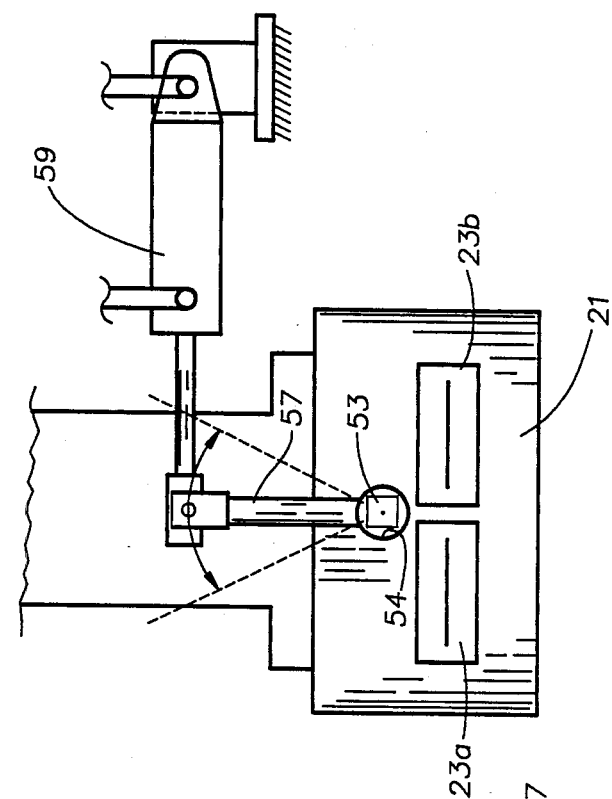
FIG. 7 is a schematic illustration showing the manner in which three-way valve is operated in the apparatus of FIG. 1.

The following description of the embodiment illustrated in FIGS. 1 and 2, for purposes of facilitating understanding makes use of the terms "length", "width" and "height" (or "depth"). The term "length" refers to the dimension that is horizontal in FIG. 2 and into the plane of the drawing in FIG. 1, and corresponds to the longitudinal dimension along the screen belts described below. The term "width" refers to the dimension that is horizontal in FIG. 1 and into the plane of the drawing in FIG. 2, and corresponds to the transverse dimension of the screen belts. The term "height" or "depth" refers to the dimension that is vertical in FIGS. 1 and 2 and corresponds to the direction of polymer flow through the screen belts.

Referring specifically to FIGS. 1 and 2 of the accompanying drawings, a conventional extruder barrel 10, through which polymer is extruded by means of an extruder screw 11, has an outflow opening communicating directly with the inflow opening 13 of a filter assembly 15 constructed in accordance with the present invention. The axes of barrel 10 and screw 11 are shown to be vertical in FIGS. 1 and 2. Outlet opening 17 of the filter assembly feeds a conventional pellet die 19. Filter assembly 15 includes a rectangular upper or inlet plate 20 and a rectangular lower or outlet plate 21. The upper surface of lower plate 21 has a rectangular channel 24 defined therein, the longitudinal dimension of which extends across the entire width of lower plate 21. A breaker plate 23 is contoured to the dimensions of channel 24 so as to fit snugly therein with the top surface of the breaker plate 23 co-planar with the top surface of lower plate 21. Breaker plate 23 and channel 24 are substantially centered with respect to the length dimension of plate 21. Two parallel screen channels 26, 28 are defined in the top surfaces of lower plate 21 and breaker plate 23. Screen channels 26, 28 are significantly shallower than channel 24, extend longitudinally across the entire length of plate 21, and are spaced widthwise from one another and from the lengthwise extending edges of plate 21. In this particular embodiment screen channels 26 and 28 are disposed on transversely opposite sides of the central vertical axis of extruder barrel 10. It will be appreciated that breaker plate 23 need not reside in a channel 24 defined in the top surface of lower plate 21; rather, it may be lengthwise and widthwise co-extensive with plates 20 and 21 and sandwiched therebetween so that screen channels 26, 28 are defined only in the top surface of the breaker plate and not in lower plate 21. As a further alternative, breaker plate 23, as a separate structure, may be eliminated and its various functions provided by appropriate channels, recesses and passages defined in the bottom surface of upper plate 20 and the top surface of lower plate 21. It is also possible to utilize two breaker plates 23a, 23b (FIG. 7) one for each screen belt, disposed in respective channels 24.

Threaded bolts 25 extend vertically through suitably aligned holes in bottom plate 21 and breaker plate 23 to threadly engage tapped bores at the underside of upper plate 20 to thereby secure the plates together. Extruder barrel 10 includes a bottom, radially-extending flange that is apertured so that similar threaded bolts can be received in tapped bores at the upper surface of plate 20 to secure the extruder barrel 10 to the filter assembly 15.

The filter inflow opening 13 is defined in the top surface of upper plate 20 and converges downwardly to join the upper end of an inlet passage 27 defined in plate 20. The lower end of passage 27 defines the inlet to a three-way valve 30 disposed in plate 20 and having two outlet passages 31 and 33 extending widthwise from the valve in opposite directions. Passages 31 and 33 bend downwardly and terminate in rectangularly flared (i.e., divergent) openings 35, 37 spaced widthwise from one another in the bottom surface of plate 20. Each opening 35, 37 is vertically aligned with a section of a respective screen channel 26, 28 in breaker plate 23. The portions of breaker plate 23 thusly aligned have plural vertically-extending through-holes 39 defined therein. Through-holes 39 feed a rectangular opening 40, defined in the top surface of plate 21, in which all four sides converge downwardly to the rectangular outlet opening 17 of the filter assembly. Opening 17 communicates with a manifold region 41 in die 19, the latter being constructed in a conventional manner.

Two screen belt filters 43, 45 extend lengthwise in respective screen channels 26 and 28. Each screen belt 43, 45 is rolled as a supply reel in a respective dispenser 47, it being noted that only the dispenser for screen belt 43 is visible in the drawings. The supply reel dispensers 47 are disposed proximate one end of the filter assembly 15 such that the screen belts 43, 45 extend along respective channels 26, 28 and are wound onto respective take-up reels 49 disposed proximate the opposite end of the filter assembly. An inlet port and seal arrangement 50, of the same general type disclosed in the aforesaid Kalman patents, is provided at each screen belt inlet into the filter assembly. An outlet port and seal arrangement 51, of the same general type as disclosed in the Kalman patents, is provided for each screen belt at the point of egress from the filter assembly. Screen belts 43, 45 move longitudinally through the filter assembly, in the manner described below, such that the portion of each screen belt that is aligned with a respective opening 35, 37 at any time is in the polymer flow path and serves a filtration function.

Three-way valve 30 is formed on a shaft 53 extending lengthwise through upper plate 20 in a suitably provided lengthwise-extending bore 54. The distal end of bore 54 is closed by threaded plug 55 disposed in bore 54; the proximal end of shaft 53 extends beyond the end of plate 20 where it is engaged by an actuator rod 57. As illustrated schematically in FIG. 7, actuator rod 57 is selectively pivoted in a vertical plane about the longitudinal axis of shaft 53 by a valve actuator 59 that may take the form of an hydraulic actuator, a solenoid, or other suitable selectively actuable mechanism. For purposes of the described embodiment, rod 57 is pivotable between three positions by actuator 59, namely: a neutral position wherein rod 57 is vertical; a first actuated or clockwise position (as viewed in FIG. 7); and a second actuated or counterclockwise position (also as viewed in FIG. 7). The actuated positions of the valve are nominally 30° from vertical.

Referring to FIGS. 2, 3 and 4, bore 54 intersects flow passages 27, 31 and 33 at their mutual intersection so that each of the passages terminate at bore 54. Shaft 57 is contoured at this mutual intersection to present a convex surface toward passage 27 such that when the valve is in the neutral position, as illustrated in FIG. 3, equal and symmetrical flow passages are provided through the valve to passages 31 and 33. In one actuated position of the valve, as illustrated in FIG. 4, polymer flow A through passage 27 is severely restricted by the valve to provide a relatively small flow B in passage 31; flow C to passage 33 is substantially unrestricted. In the other actuated position of the valve, flow B from the valve to passage 31 is substantially unrestricted, while flow C to passage 33 is severely restricted. Importantly, the flow to the restricted passage is not completely closed but is typically five to twenty percent of the total flow entering the valve. Also, the degree of restriction of passage 31 in one actuated position of the valve is substantially the same degree of restriction of passage 33 in the other actuated position of the valve.

As an example of the operation of the embodiment illustrated in FIGS. 1 and 2, assume that two screen belts 43, 45 are employed with widths of eight inches. Perforations or holes 39 in the breaker plate, for this example, are assumed to be disposed in respective square areas of the plate, with each side of the square being approximately 7.8 inches. In normal operation, with the valve in its neutral position illustrated in FIGS. 1 and 3, half of the polymer from extruder barrel 10 flows through each of the screen belts 43 and 45 and joins together at the egress of the breaker plate in region 40. From this region the polymer flows through outlet 17 to the pellet die or other location at which the filtered polymer material is to be formed. The inlet seal 50 and outlet seal 51 for each belt 43, 45 is provided with heating and cooling water controls in the manner described by Kalman, the controls being independent for each belt 43, 45. In other words, a seal for one belt may be heated while the corresponding seal for another belt may be cooled, etc. If the valve 30 is actuated to the position illustrated in FIG. 4, the flow path to passage 31 and filter 43 is restricted whereas the flow path through passage 33 to filter 45 is open. For purposes of this example, assume that dirty reclaimed polymer is being filtered at a rate of 2,000 pounds per hour equally through both filters 43, 45, and that the filter inlet pressure is 2,000 psig at valve inlet passage 27. Further assume that a pressure of 500 psig is required at the manifold 41 of pellet die 19 in order to cause polymer to flow through the die to make polymer pellets. The pressure in region 40 will be only slightly higher than required in manifold 41 and typically would be about 530 psig. When the valve is in its neutral position, the pressure in passages 31 and 33 is the same, typically 1900 psig. For this example, the resulting pressure drop across each filter 43, 45 and breaker plate 23 is 1370 psig. If it is assumed that the pressure drop across the breaker plate is 70 psig, the resulting pressure drop across each filter 43, 45 is approximately 1300 psig. This pressure drop is sufficiently high, and the breaker plate area is sufficiently large, that movement of either screen belt 43, 45 is nearly impossible. However, if the valve is actuated to the position illustrated in FIG. 4, the pressure across the screen belt fed by the restricted passage is considerably reduced. For example, assume that in the actuated position ninety percent of the polymer flows to passage 33 and only ten percent of the polymer flows to passage 31. Under these conditions the polymer flow rate through screen belt 45 is 1800 pounds per hour whereas the flow rate through screen belt 43 is only 200 pounds per hour. The pressure in passage 27 rises somewhat, typically to 3,000 psig. The pressure in passage 31 falls to approximately 774 psig, computed as the sum of the required pressure at die inlet manifold 41 (500 psig) plus the pressure across the breaker plate 23 and across screen belt 43 (274 psig, or 20% of the previous pressure drop of 1370 psig across the screen belt and breaker plate, since only 10% of the polymer now flows through that screen belt instead of the previous 50%). The pressure in passage 33 is approximately 2,850 psig, yielding a net pressure difference of 2,076 psig between passages 31 and 33 when the valve is actuated. The pressure holding screen belt 43 against breaker plate 23 is now five times less than when the valve is in its neutral position, thereby permitting screen belt 43 to be moved by pulling on the screen at the filter exit, or by utilizing the Kalman method of differential leakage by controlling the temperatures at inlet seal 50 and exit seal 51. Since the pressure holding screen belt 43 against the breaker plate 23 is five times lower than normal, the active filtering area can be made five times greater than for a standard Kalman filter while retaining the capability of advancing the screen belt. Once the screen belt is moved, the valve can be placed in its other actuated position so that screen belt 45 can be moved. Each belt may be moved in a totally automatic manner as described below.

It is noted that, although it is possible to construct valve 30 so that all of the polymer flow to one of the filters is blocked in the actuated valve position, this is an undesirable situation because air would be carried into the filter body as the screen is advanced. Under such circumstances, when flow is resumed in the interrupted passage, air would be carried out from the filter exit and interrupt the extrusion process. It is only necessary to retain a low flow rate of polymer through the screen being moved in order to prevent air from entering the filter path. It may be desirable to provide a greater flow than five or ten percent of normal in order to minimize the extruder exit pressure fluctuation as one of the screen belts is being advanced.

The apparatus described above, including a single filter assembly 15 through which both screen belts pass, is a convenient compact assembly and preferred for the present invention. However, it will be understood that two separate filter assemblies, one for each screen belt, may be employed. Likewise, while a three-way valve 30 is a convenient control mechanism for proportioning flow, a tee connection and a pair of two-way valves would function just as well, with one of the valves being throttled to reduce flow to the screen belt that is being advanced.

An alternative embodiment of the filter arrangement of the present invention is illustrated in FIG. 5 and differs, in substance, from the embodiment of FIGS. 1 and 2 only in that flow passages 31, 33 (leading to the screen belts) and flow passage 17 (leading away from the screen belts) are mutually offset in the length dimension (i.e., not vertically aligned). Inlet passage 27a is oriented at an angle from vertical so that valve 30, at the downstream end of passage 27a, can be offset from the vertical axis of inlet opening 13. Outlet opening 17, in turn, is oppositely offset from that axis. The offset permits the polymer flow to have a flow component, at the screen belt, along the direction of screen belt movement. The resulting viscous shear forces imparted to the screen belt by the polymer assist in moving the screen belt through the filter assembly at those instances of time in which the screen belt is to be moved. Thus, passages 31, 33 are closer to the side of the assembly at which the screen belts enters, and outlet passage 17 is closer to the side of the assembly at which the screen belts exit.

Figure 6:
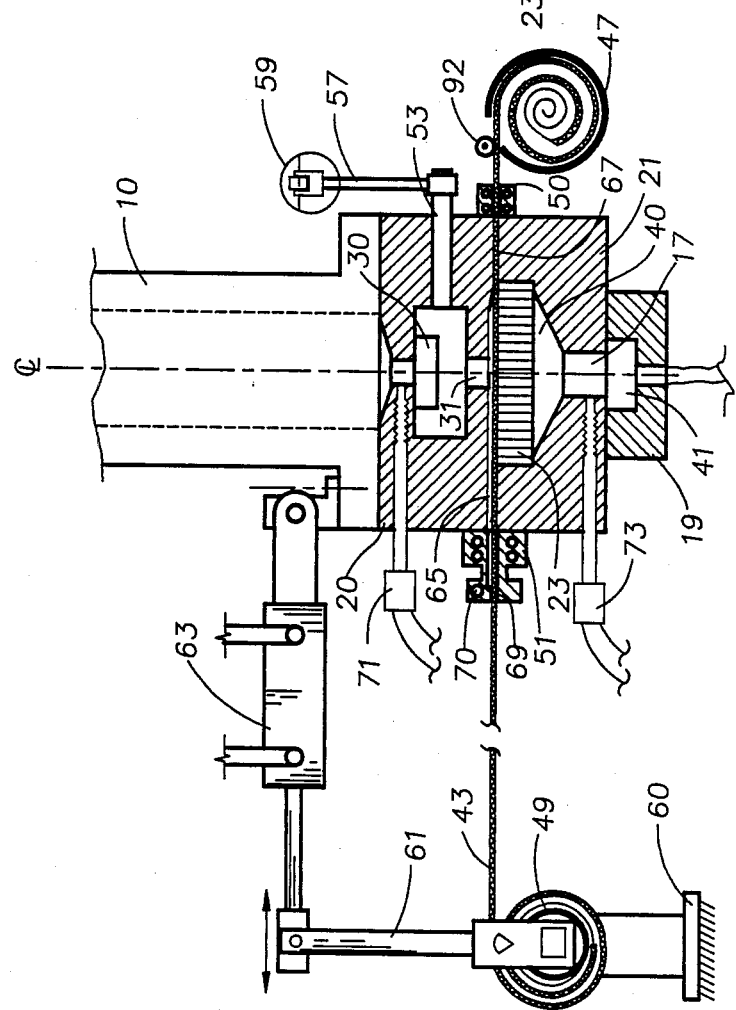
FIG. 6 is a schematic illustration of the apparatus of FIG. 1 illustrating how various control elements associated with filter screen movement and valve operation functionally interact with the filter assembly.

FIG. 6, which is presented for diagrammatic purposes only, is a view similar to that of FIG. 2 in which various sensors and control devices associated with belt movement are shown interacting with the filter assembly. The purpose of FIG. 6 is to show how each of these various devices interact so that the schematic diagrams of FIGS. 8, 9 and 10 (described in detail below) can be better understood. It will be appreciated that not all of the sensors and control devices illustrated in FIG. 6 will be employed in the same embodiment; rather, the sensors and control devices employed for any embodiment depends on the particular mode of screen belt motion control selected. As illustrated, the screen belt 43, after passing through the filter assembly, is rolled up on take-up reel or capstan 49 supported on a base 60. Capstan 49 is driven by a ratchet mechanism 61 controlled by a screen-pulling air or hydraulic cylinder 63. As described below, the screen-pulling cylinder is actuated in synchronization with valve actuation so that the screen belt can be moved in the filter flow path receiving reduced polymer flow.

Instead of a screen-pulling arrangement, the screen belts may be moved by the method disclosed in the Kalman patents (e.g., U.S. Pat. No. 3,471,017). In this arrangement the exit slots 65 from which the screen belts exit from the filter assembly are rendered much larger than the entrance slots 67. For example, this may be achieved by cutting away a portion of the bottom surface of upper plate 20 overlying the screen belts in the region between exit seal 51 and breaker plate 23. The enlarged slot 65 tends to cause massive polymer leakage from that slot except for the fact that the leaking polymer is solidified into a solid plug by cool water passing through the exit seal 51. The solidified polymer plug is prevented from moving by restricting the slot at 69 at the outlet portion of the exit seal 51 to provide a short section of narrow slot depth. A heater 70 associated with exit seal 51 is selectively actuated to soften the solidified polymer plug, permitting it to be extruded through the restricted slot region 69, carrying the screen belt with it. It will be appreciated that if a mechanical screen puller (e.g., ratchet 61) is employed, the exit seal 51 would be identical to the entrance seal 50 without a need for the described exit dam or heater. Both of these types of screen displacement devices are described in the aforesaid Kalman U.S. Pat. No. 3,471,017 for a single screen belt. Each of the two belts employed in the present invention has a separate and identical set of inlet and outlet seals, exit heater (or belt pulling device) and screen belt dispenser. The prior art single screen belt filters conventionally employ heaters, such as heater 70. It is also conventional, in single screen belt systems, to derive signals from an upstream pressure transducer 71 positioned to sense the polymer pressure received from the extruder barrel 10, and/or from a downstream pressure transducer 73 positioned to sense the polymer pressure in the outlet passage 17 from the filter assembly. These pressure-related signals are used to control the operation of heater 70 or a screen puller arrangement such as the ratchet 61 and capstan 49. The following paragraphs present descriptions of alternative methods for synchronizing these various screen movement arrangements with operation of valve 30 so that the appropriate screen belt is advanced when the flow therethrough is reduced. These methods relate to the schematic diagrams illustrated in FIGS. 8, 9 and 10 wherein various gates are illustrated to control signal flow. These gates may be electronic logic gates, electromechanical relays, or any other known mechanism wherein control signals are used to selectively pass and block passage of another signal.

Figure 8:
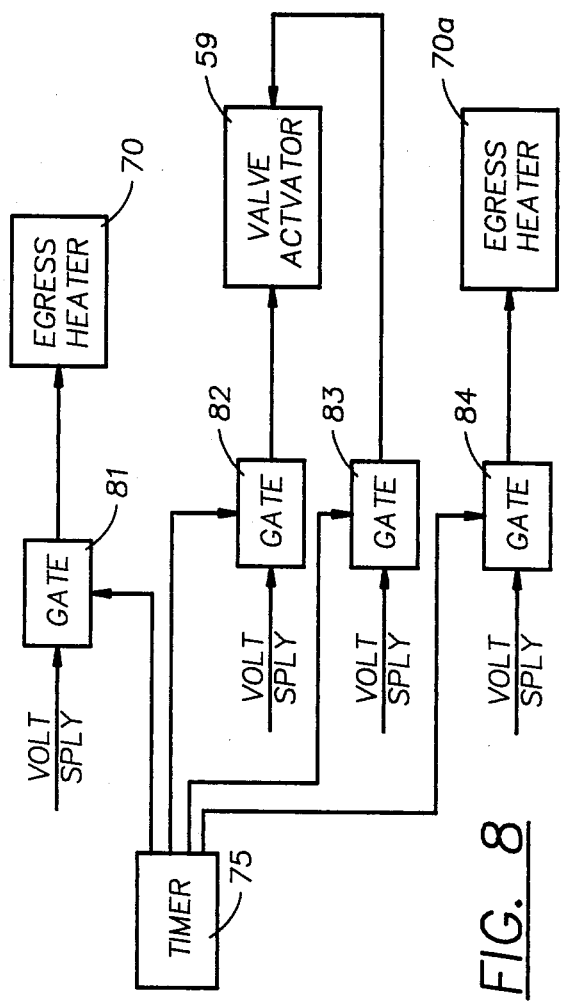
FIG. 8 is a schematic illustration of one embodiment of a control arrangement for synchronizing movement of the filter screen and actuation of the three-way valve in the system of FIG. 1.

Referring to FIG. 8, one method for synchronizing advancement of the screen belts with valve operation employs a timer 75 which may be any commercially available timer that can be set to provide signals at desired times selected by an operator. Timer 75 is set to provide four signals, at four different times, to actuate respective gates 81, 82, 83 and 84. The times at which these signals are provided is selected by the machine operator in accordance with the desired time intervals between screen belt advances. Assume that each screen belt is to be moved once every hour and that the time between movement of the first belt and movement of the second belt is one-half hour. Assume further that the exit heaters 70, 70a for the first and second screen belts, respectively, is turned on for three minutes to permit belt movement. At the start of a movement cycle, timer 75 provides a signal to actuate gate 81 to pass supply voltage to egress heater 70 for one of the screen belts. The signal from timer 75 to gate 81 remains present for three minutes. Assume that after two minutes of heating, the egress dam 69 (FIG. 6) becomes sufficiently hot to soften the polymer plug so that it may be extruded past the dam and carry screen 43 therewith. However, since region 65 is considerably larger than normal for a screen belt filter, the screen cannot move because it is pinned against breaker plate 23 by the differential pressure across the screen. Thus, at the two-minute time of the cycle, timer 75 sends a second signal to energize gate 82 and pass supply voltage to the valve actuator 59, thereby rotating the valve 30 to a position wherein flow through screen belt 43 is restricted. At this time screen belt 43 experiences a greatly reduced pressure drop and immediately advances through the exit seal 51 under the driving force of the now extruded softened polymer plug. At the three-minute point in the cycle, timer 75 removes the signals from gate 81 and 82 to thereby de-energize egress heater 70 and to cause valve actuator 59 to return to its neutral position. At this time, or very shortly thereafter, movement of screen belt 43 ceases due to the cooling at the exit dam 69 and the increased pressure drop across screen belt 43.

It is to be noted that with valve 30 in its neutral position, the pressure drop across both screens becomes essentially the same, causing more of the polymer to flow through the screen that has just been advanced because that screen is cleaner. A typical advance of the screen is on the order of one quarter inch to two inches, depending upon the size of the filter area.

Thirty minutes after actuation of egress heater 70 for screen belt 43, timer 75 provides a signal to gate 84 to energize egress heater 70a for screen belt 45. Two minutes later gate 83 is actuated by another signal from timer 75 to permit valve actuator 59 to be actuated in the opposite sense from that described above, thereby restricting the flow through screen belt 45. The sequence for screen belt 45 is substantially the same as that described above for screen belt 43. In this method of synchronizing screen belt movement to valve actuation, a minimum of control equipment is required; however, the method is satisfactory only if the contamination or dirt in the molten polymer is very consistent (e.g., in the case of a pigmented polymer). If the polymer contamination is variable, as is common for re-melted plastic waste materials, a screen movement method based on pressure, as described below is more suitable.

Figure 9:
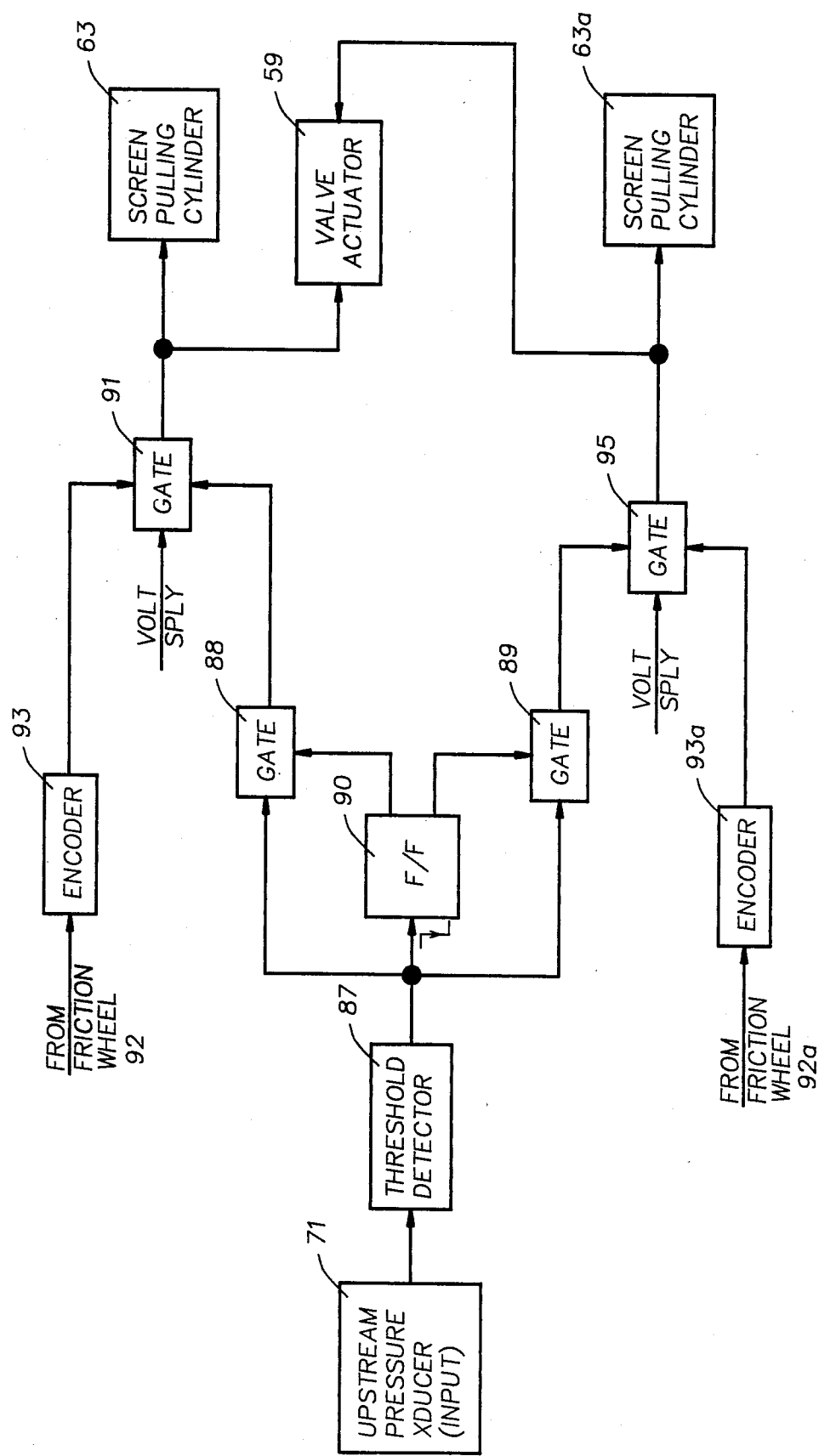
FIG. 9 is a schematic illustration of an alternative embodiment of the control arrangement for synchronizing filter screen movement and valve actuation.

A second method for synchronizing valve operation and belt advancement is illustrated schematically in FIG. 9 to which specific reference is now made. Assume that waste polymer is utilized in a pelletizing operation wherein the extruder screw 11 turns at a fixed rotation rate. Since the extruder is not a positive displacement device, polymer output flow decreases if pressure at the screw exit, as sensed by pressure transducer 71 is permitted to increase. Since polymer contamination may flow through the extruder in an irregular manner, screen movemnt is triggered by a rise in extruder exit pressure detected by transducer 71. Since it is desirable to move a screen immediately upon its becoming contaminated, a mechanical method of pulling the screen (such as capstan 49) is preferable in order to avoid the delay required for egress heater 70 to soften the exit polymer plug. Assume a normal pressure detected by the upstream pressure transducer 71 to be 1,000 psig, and that a rise in pressure of 100 psig is deemed sufficient to require screen belt advancement. Threshold detector 87 receives the output signal from pressure transducer 71 and provides an output signal at a predetermined level anytime the monitored pressure exceeds 1100 psig. This output signal is applied to each of gates 88 and 89, transmission through which is controlled alternatively by means of flip-flop 90. Flip-flop 90 changes from one state to the other each time the output signal from threshold detector 87 falls from the aforesaid predetermined level to its reference level. In other words, assume that the pressure sensed by pressure transducer 71 is below the threshold level (assumed to be 1100 psig) so that a low level output signal is provided by threshold detector 87. Assume further that flip-flop 90 is in the state wherein gate 88 is actuated. The low level output signal from threshold detector 87 may pass through gate 88 but is insufficient to actuate gate 91. If the sensed upstream pressure reaches the 1100 psig threshold, the output signal from threshold detector 87 rises to the predetermined level and passes through gate 88 to actuate gate 91. When the sensed pressure returns to a level below 1100 psig, the output signal from threshold detector 87 returns to its reference level at which point flip-flop 90 switches states so that gate 89 is actuated and gate 88 is de-actuated. Accordingly, the next time the pressure sensed by transducer 71 reaches 1100 psig, the resulting output signal from threshold detector 87 passes through gate 89 and not gate 88.

Gate 91 is typically a flip-flop or self-latching relay that, once actuated, remains actuated until such time as a signal from encoder 93 is received. Specifically, referring to FIG. 6, a friction wheel 92 rides on the screen belt at a location proximate the screen belt inlet to the filter assembly and drives an encoder 93. The encoder provides an output signal after a predetermined length of screen belt has been moved during the present cycle. The output signal from encoder 93 thus deactuates gate 91 after the clogged portion of the screen belt has been moved out of the polymer flow path.

During the time that gate 91 is actuated, both the screen pulling cylinder 63 for screen belt 43 and the valve actuator 59 are energized. When gate 91 is de-actuated, the screen pulling cylinder 63 is de-energized to prevent further advance of screen belt 43. Valve actuator 59 is also de-energized at this time, permitting the valve 30 to return to its neutral position.

Instead of rendering gate 91 self-latching, it may be desirable, for some applications, to permit gate 91 to be deactuated if the pressure sensed by transducer 71 falls below another predetermined pressure level (e.g., 1000 psig). Under such circumstances, gate 91 can be alternatively de-actuated by a pressure drop or by a sufficient advance of the screen belt corresponding to the length of the perforated area of the breaker plate so that all of the dirty portions of the screen belt pass beyond the polymer flow path.

Once the valve actuator 59 and screen pulling cylinder 63 have been de-energized, polymer flows freely through both filters. The next time the pressure sensed by transducer 71 increases, gate 89 is actuated to actuate gate 95 which is the same type device as gate 91. Gate 95 passes supply voltage to energize the screen pulling cylinder 63a for screen belt 45 and energizes valve actuator 59 to restrict polymer flow through screen belt 45. An encoder 93a responds to a friction wheel 92a to de-actuate gate 95 after a sufficient advance of filter screen 45 has been efected. Gate 95 may be alternatively de-actuated by a fall in the pressure sensed by transducer 71 in the manner described above.

The method described above and illustrated in FIG. 9 allows more frequent screen movements, and significantly larger movements, than the method described in connection with FIG. 8 wherein the Kalman method of effecting screen movement is employed. It may be desirable, when actuating valve 30 by means of valve actuator 59 to prevent too abrupt a pressure increase across the wide open section of filter screen. In order to accomplish this, snubber valves may be placed in the hydraulic lines feeding valve actuator 59 to control the rate at which the valve 30 is rotated.

Figure 10:
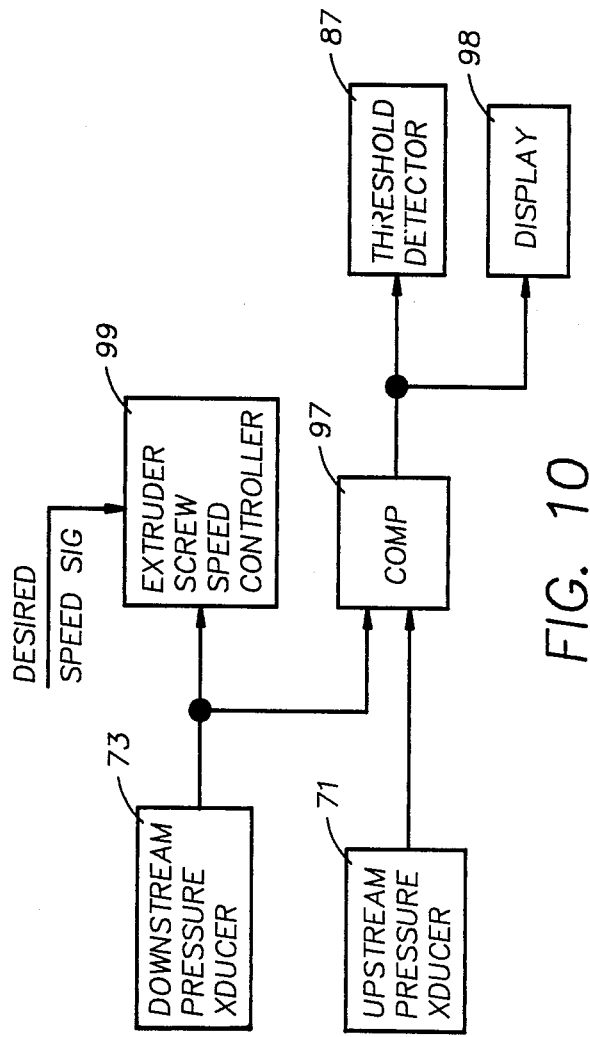
FIG. 10 is a schematic illustration of still another modified control arrangement.

A still further alternative technique for synchronizing movement of valve 30 and the advance of the screen belts is illustrated in FIG. 10 to which specific reference is now made. The output signals from downstream pressure transducer 73 and upstream pressure transducer 71 are applied to a comparator 97 arranged to provide an output signal proportional to the difference between the two measured pressures. In addition, the downstream pressure transducer 73 applies its output signal to the speed controller 99 for the extruder screw 11. Speed controller 99 also receives a manually set desired downstream pressure signal. Control of the extruder screw rotational speed by controller 99 in response to the desired pressure signal and the measured pressure signal results in a feed back control or servo mechanism acting to maintain the downstream pressure constant at the desired pressure (e.g., 300 psig). Providing a constant pressure at the die inlet maintains a constant melt rate from the extruder with the extruder screw speed fluctuating as necessary to push enough polymer through the filter to maintain the constant downstream pressure. This type of extruder speed control scheme is conventional in the extrusion industry.

The differential pressure signal from comparator 97 drives a display 98 which provides a visual indication of the differential pressure. The operator may set a desired differential pressure, for example, 700 psig, yielding an upstream pressure at transducer 71 of 1000 psig in the present example. The operator may also set a maximum differential pressure (e.g., 800 psig). Whenever the differential pressure reaches 800 psig, valve 30 and one of the screen capstans 49 is actuated, as described above in connection with FIG. 9, via the threshold detector 87. In other words, threshold detector 87 illustrated in FIG. 10 corresponds to the threshold detector 87 illustrated in FIG. 9, and all of the circuit components following threshold detector 87 in FIG. 9 may follow the threshold detector illustrated in FIG. 10 to perform the same operation described above. If the rate of movement of valve 30 and capstans 49 are maintained fairly slow (e.g., by means of appropriate snubber valves in their respective actuator lines), then the extruder pressure control system described herein is capable of adjusting the extruder screw speed to maintain a constant downstream pressure and, thereby, a constant flow rate through the die. This method is also appropriate if the polymer leaving the filter is directed to one or more polymer metering pumps as is common in the extrusion of synthetic textile fibers, since it is important to maintain a constant pressure feeding those pumps.

From the foregoing description it will be appreciated that the present invention makes available a novel method and apparatus for filtering molten polymer as part of an extrusion process, wherein clogged filter sections can be readily changed automatically without the disadvantages attendant on prior art approaches to this problem.

Having described preferred embodiments of a new and improved method and apparatus for effecting continuous polymer filtration in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What I claim is:

1. A method for filtering flowing molten polymer material comprising the steps of:
   (a) flowing the molten polymer through a plurality of flow paths;
   (b) combining the molten polymer from all of said flow paths into a common output flow;

(c) extending across each of said flow paths a respective strip of filter material such that all polymer flowing through that flow path must pass through a selected length section of the filter strip; then (d) selectively reducing the flow rate of polymer through one of said flow paths in which the filter strip is to be advanced lengthwise to present a clean length section of the strip to the flowing polymer;

(e) advancing the filter strip in said one flow path while the polymer flow rate therethrough is reduced in accordance with step (d) until said clean length section of the advanced filter strip is disposed in said one flow path; and then (f) restoring the flow rate through said one flow path to the flow rate present prior to step (d).

2. The method according to claim 1 wherein step (d) includes maintaining said common output flow substantially constant in spite of the reduction of flow rate in said one flow path.

3. The method according to claim 2 wherein steps (d), (e) and (f) are a sequence that is performed automatically at a pre-set time.

4. The method according to claim 2 wherein steps (d), (e) and (f) are performed automatically as part of a filter changing cycle, wherein the cycle is repeated periodically at predetermined times.

5. The method according to claim 4 wherein steps (d), (e) and (f) of said filter changing cycle are performed for each of said flow paths repeatedly and at different times.

6. The method according to claim 2 wherein steps (d), (e) and (f) are performed as part of a filter changing cycle in response to pressure changes in said molten polymer.

7. The method according to claim 1 wherein said plurality of flow paths are two in number, and:

wherein step (a) comprises apportioning the flowing molten polymer equally and at equal flow rates through said two flow paths; and wherein step (d) comprises increasing the flow rate of polymer through the other flow path simultaneous with said selectively reducing the flow rate of polymer through said one flow path.

8. The method according to claim 7 wherein step (d) includes reducing the flow rate of polymer in said one flow path by the same amount as the flow rate is increased in the other flow path.

9. The method according to claim 7 wherein steps (d), (e) and (f) are performed as part of a filter changing cycle for each of said two flow paths in alternation.

10. The method according to claim 1 wherein step (e) includes, at least in part, flowing the polymer through the filter strip in said one flow path with a flow component in the direction of advancement of the filter strip so as to impart viscous shear forces on the filter strip to assist in advancing the filter strip.

11. A continuous polymer filter apparatus comprising:

supply means for delivering molten polymer under pressure;

means defining first and second separate filter paths;

valve means for receiving the delivered molten polymer and selectively apportioning it between said first and second filter paths, said valve means having a normally neutral position in which the flow rates through said filter paths are substantially equal, a first extreme position in which the flow rate of polymer through said first filter path is substantially unrestricted and the flow rate through said second filter path is present but severely restricted, and a second extreme position in which the flow rate of polymer through said second filter path is substantially unrestricted and the flow rate through said first filter path is present but severely restricted;

first and second filter screen belts extending substantially transversely through said first and second filter paths, respectively, each screen belt being movable through its respective filter path, when the flow rate through said respective filter path is restricted, to change longitudinal sections of the screen belt through which apportioned polymer flows;

first screen advance means, selectively operable only when flow through said first filter path is restricted by said valve means, to advance said first screen belt across said first filter path;

second screen advance means, selectively operable only when flow through said second filter path is restricted by said valve means, to advance said second screen belt across said second filter path; and means for combining polymer flow from said first and second filter paths in a common flow path.

12. The apparatus according to claim 11 further comprising control means responsive to a predetermined pressure increase in the delivered polymer for automatically: (a) actuating said valve means from said neutral position to said first extreme position to severely restrict the polymer flow through said second filter path while increasing the flow through said first filter path; (b) actuating said second screen advance means to advance the second screen belt through said second filter path; and then (c) returning said valve means to said neutral position.

13. The apparatus according to claim 12 wherein said control means further comprises means responsive to the return of said valve means to said neutral position for automatically: (d) actuating said valve means from said neutral postion to said second extreme position to severely restrict the polymer flow through said first filter path; (e) actuating said first screen advance means to advance the first screen belt through said first filter path; and then (f) returning said valve means to said neutral position.

14. The apparatus according to claim 11 further comprising timer means for periodically changing filter sections in said second filter path by: (a) actuating said valve means from said neutral position to said first extreme position to severely restrict the polymer flow through said second filter path; (b) actuating said second screen advance means to advance the second returning said valve means to said neutral position.

15. The apparatus according to claim 11 wherein said timer means further comprises means for periodically, and at times othe than when filter screens are being changed in said second filter path, changing filter sections in said first filter path by: (d) actuating said valve means from said neutral position to said second extreme postion to severely restrict the polymer flow through said first filter path; (e) actuating said first screen first filter path; and then (f) returning said valve means to said neutral psoition.

16. A continuous polymer filter apparatus comprising:

supply means for delivering molten polymer under pressure;

means defining first and second separate filter paths;

valve means for receiving the delivered molten polymer and selectively apportioning it between said first and second filter paths, said valve means having a neutral position in which the flow rates through said filter paths are substantially equal;

first and second filter screen belts extending substantially transversely through said first and second filter paths, respectively, each screen belt being movable through its respective filter path to change longitudinal sections of the screen belt through which apportioned polymer flows;

screen advance means for longitudinally advancing each screen belt across its filter path when the flow rate through that fildter path is below a predetermined flow rate;

means for combining polymer flow from said first and second filter paths in a common flow path; and control means responsive to a predetermined pressure increase in the delivered polymer for automatically: (a) actuating said valve means from said neutral position to said first extreme position to severly restrict the polymer flow through said second filter path while increasing the flow through said first filter path; (b) actuating said second screen advance means to advance the second screen belt through said second filter path; and then (c) returning said valve means to said neutral position.

17. The apparatus according to claim 16 wherein said control means further comprises means responsive to the return of said valve means to said neutral position for automatically: (d) actuating said valve means from said neutral postion to reduce the polymer flow through said first filter path; (e) actuating said screen advance means to advance the screen belt a predetermined distance through said second filter path; and then (f) returning said valve means to said neutral position.

18. A continuous polymer filter apparatus comprising:

supply means for delivering molten polymer under pressure;

means defining first and second separate filter paths;

valve means for receiving the delivered molten polymer and selectively apportioning it between said first and second filter paths, said valve means having a neutral position in which the flow rates through said filter paths are substantially equal;

first and second filter screen belts extending substantially transversely through said first and second filter paths, respectively, each screen belt being movable through its respective filter path, to change longitudinal sections of the screen belt through which apportioned polymer flows;

screen advance means for longitudinally advancing each screen belt across its filter path when the flow rate through that filter path is below a predetermined flow rate;

means for combining polymer flow from said first and second filter paths in a common flow path; and timer means for periodically changing filter sections in said second filter path by: (a) actuating said valve means from said neutral position to reduce the polymer flow through said first filter path; (b) actuating said second screen advance the screen belt a predetermined amount through said first filter path; and then (c) returning said valve means to said neutral position.

19. The apparatus according to claim 18 wherein said timer means further comprises means for periodically, and at times other than when filter screens are being changed in said first filter path, changing filter sections in said second filter path by: (d) actuating said valve means from said neutral position to reduce the polymer flow through said second filter path; (e) actuating said screen advance means to advance the screen belt a predetermined distance through said second filter path; and then (f) returning said valve means to said neutral position.

* * * * *

UNITED STATES PATENT AND TRADEMARK OFFICE
CERTIFICATE OF CORRECTION

PATENT NO. : 4,849,113

DATED : July 18, 1989

INVENTOR(S) : William H. Hills

It is certified that error appears in the above-identified patent and that said Letters Patent is hereby corrected as shown below:

Column 1, line 34, delete "shitted" and insert --shifted--

Signed and Sealed this

Twenty-second Day of May, 1990

*Attest:*

HARRY F. MANBECK, JR.

*Attesting Officer*   *Commissioner of Patents and Trademarks*